United States Patent
Wu et al.

(10) Patent No.: US 6,947,669 B2
(45) Date of Patent: Sep. 20, 2005

(54) GENERIC OPTICAL ROUTING INFORMATION BASE SUPPORT

(75) Inventors: Quansheng Wu, Nepean (CA); Ling-Zhong Liu, Ottawa (CA)

(73) Assignee: Meriton Networks Inc., Ottawa (CA)

(*) Notice: Subject to any disclaimer, the term of this patent is extended or adjusted under 35 U.S.C. 154(b) by 674 days.

(21) Appl. No.: 10/087,788

(22) Filed: Mar. 5, 2002

(65) Prior Publication Data

US 2002/0126344 A1 Sep. 12, 2002

Related U.S. Application Data

(60) Provisional application No. 60/273,641, filed on Mar. 7, 2001.

(51) Int. Cl.[7] ............................................... H09J 14/00
(52) U.S. Cl. ............................ 398/57; 398/58; 398/59; 370/238; 370/351; 370/400
(58) Field of Search .......................... 398/57, 58, 59; 370/238, 351, 400, 401

(56) References Cited

U.S. PATENT DOCUMENTS

| | | | |
|---|---|---|---|
| 5,430,727 A | 7/1995 | Callon | 370/85.13 |
| 5,687,168 A | 11/1997 | Iwata | 370/255 |
| 5,917,820 A | 6/1999 | Rekhter | 370/392 |
| 5,995,503 A | 11/1999 | Crawley et al. | 370/351 |
| 6,778,541 B2 * | 8/2004 | Houston et al. | 370/401 |
| 2002/0004843 A1 * | 1/2002 | Andersson et al. | 709/238 |
| 2002/0067731 A1 * | 6/2002 | Houston et al. | 370/401 |

* cited by examiner

*Primary Examiner*—M. R. Sedighian
*Assistant Examiner*—Dzung Tran
(74) *Attorney, Agent, or Firm*—Marks & Clark; S. Mark Budd

(57) ABSTRACT

This application proposes a solution that makes access to the Optical Link State (OLS) information more efficient for use by upper level applications. Applications are independent of underlying routing protocols. This solution applies to all Link State based IGP protocols with the extension to optical networks, including OSPF and IS-IS.

15 Claims, 1 Drawing Sheet

Generic ORIB Management Software Architecture

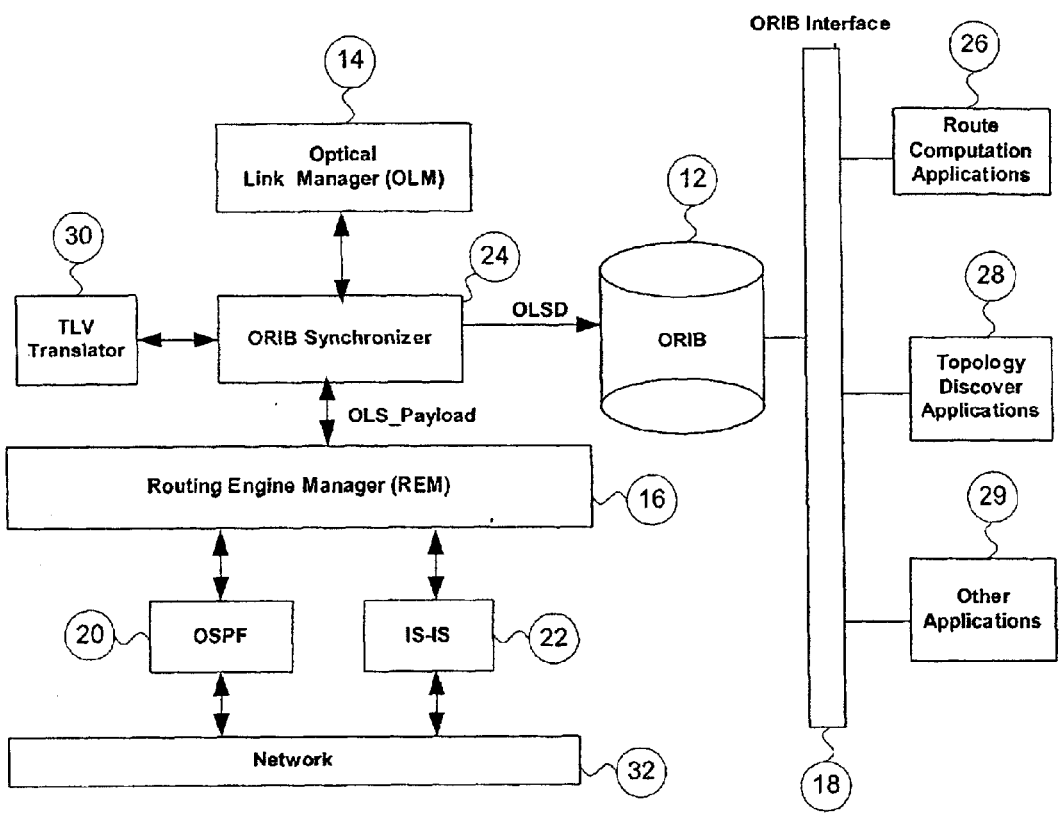
Figure 1: Generic ORIB Management Software Architecture

GENERIC OPTICAL ROUTING INFORMATION BASE SUPPORT

This invention claims the benefit of U.S. Provisional application No. 60/273,641 filed Mar. 7, 2001.

FIELD OF THE INVENTION

This invention relates to communications systems and more particularly to optical routing and signaling for such systems.

BACKGROUND

Future agile optical networks are, at the request of customers, expected to quickly and automatically provision lightpaths. Successful provisioning depends on two basic functions of network control: routing and signaling. The routing function automatically updates the optical network topology and related resource information so that a node can compute a light path for the request. The signaling function ensures that the nodes along a computed route exchange the information to set up or tear down a lightpath without user intervention.

Most current control network approaches are based on the extension of existing Internet Protocols (IP). The IP routing protocol OSPF (Open Shortest Path First) and IS-IS (Intermediate System to Intermediate System) are extended to exchange optical network routing information and construct the optical routing information database. These extended protocols rely on the instant and periodic exchange of the link state information (LSA {Link State Advertisement} of OSPF, or LSPDU {Link State Protocol Data Unit} of IS-IS) between the directly connected (physically or logically) pairs of nodes, called neighbors. The extension of these routing protocols introduces new optical network related information that should be exchanged using the existing LSA or LSPDU mechanisms. This new information is coded by a number of Type/Length/Value triplets (TLV). For OSPF, these TLVs are exchanged by Opaque LSAs that are designed to exchange application related information. In the IS-IS protocol, the new TLVs are appended to the LSPDUs. In both cases, the information conveyed by the TLVs is not understandable by the protocol. There is no further processing by the protocol, other than checking the integrity of the data exchange, storing it in an internal format, and notifying interested applications that the information was received.

In the context of optical networks, the optical link information, such as end point IDs, link type, bandwidth, encoding type, shared risk group IDs, etc., are exchanged by the routing protocols. This information will be used or updated by different applications. For example, the route computation component needs the topology information and the related optical link properties to find a route to set up a lightpath the meets the constraints of the data. The link management applications, which interact with the routing protocol to add or remove an optical link on the node, can also update the information on an existing optical link, e.g., available resources changes.

There are basically three types of interactions between the applications and the routing engines for Optical Link State (OLS) information processing. The first changes the OLS information, e.g. adds or removes an optical link. In the second interaction the routing engine notifies interested applications that a new OLS is received, an existing OLS is deleted, an existing OLS is updated, etc. In the third interaction other applications use the OLS information for route computation, topology discovery, etc. Changes to the OLS information will cause the OLS information to flood the routing space.

As described above, all of the OLS information is stored in the internal format in a routing engine without further processing. It is possible that applications can access the OLS in the routing engine, but this type of access is unacceptable for the following reasons. First, as the OLS is encoded in TLVs, each time an application searches the information it needs to translate the TLVs into some readable data structure; this wastes time and processing power. Second, access to a specific routing engine requires creating applications with protocol-specific code; this limits the flexibility of the network. Additionally, the topology changes in an optical network are much less than in an IP network, so it would be beneficial to reduce the repetition in processing the TLVs.

SUMMARY OF THE INVENTION

Based on the above analyses, this application proposes a solution that makes access to the OLS information much more efficient and free from underlying routing protocols. This proposal applies to all Link State based IGPs (Interior Gateway Protocols) with the extension to optical networks, including OSPF and IS-IS.

The main goal of this invention is to design a protocol-independent solution that facilitates the update and use of the OLS information. To achieve this goal, we propose a generic interface for applications that manage or use the OLS, and a unified ORIB (Optical Routing Information Base).

With the generic interface, the applications that need to interact with the OLS can be developed without knowledge of the details of the underlying routing protocols. The applications are unchanged if a new routing protocol is deployed into the node, or an existing routing protocol is modified because of changes in the standard.

The unified ORIB ensures that the OLS information base structure is independent of the data structure specific to underlying routing protocols. This separation gives a system designer the flexibility to choose the appropriate database design according to his/her system design requirements, without having to take into account the impact of the underlying protocol.

Therefore in accordance with a first aspect of the present invention there is provided a system for providing access to optical link state information in an optical network comprising: a unified database that maintains optical link state information independent of data structure of underlying routing protocols; and a protocol independent generic interface between the unified database and applications requiring access to the optical link state information.

In accordance with a second aspect of the invention there is provided a method of providing access to optical link state (OLS) information in an optical network comprising: maintaining optical link state information in a unified database, the optical link state information being independent of data structure of underlying routing protocols; and providing a protocol independent generic interface between the unified database and applications requiring access to the optical link state information.

BRIEF DESCRIPTION OF THE DRAWINGS

The invention will now be described in greater detail with reference to the attached drawing of FIG. 1, which illustrates one example of a generic optical routing information base management software architecture.

DETAILED DESCRIPTION OF THE INVENTION

An implementation of the solution according to the present invention follows.

As shown in FIG. 1 the solution can be implemented by four key components: a unified ORIB 12, an OLM (Optical Link Manager) 14, a REM (Routing Engine Manager) 16, and a generic REM interface 18. FIG. 1 illustrates the software architecture of the implementation.

The ORIB 12 is a unified database that hides the details of the underlying routing protocols. The ORIB is implemented as an array of OLSD (Optical Link State Data) structures. The data structure is designed for ease of use by the interested applications. An OLSD contains the properties of the optical link that can be understood by any routing protocol, e.g. OSPF 20 or IS-IS 22. This information is extracted from an OLS and stored in the routing engine. The OLSD has an internal key that maps to the corresponding OLS in the routing engine. This key ensures a one-to-one relationship between an OLSD in the ORIB and a corresponding OLS stored in the routing engine. When an OLS is updated in the routing engine, the corresponding OLSD in the ORIB is also updated. This update keeps the ORIB and routing engine OLS database synchronized.

The OLM 14 component manages the optical links attached to the local optical interface. The OLM configures, maintains and monitors the optical link departures and terminations on the node.

The REM 16 manages the underlying routing protocols. It also configures, maintains and monitors the underlying routing engines. The REM can plug multiple routing engines into the system. The REM interacts with the ORIB Synchronizer 24 to update the ORIB when an update is received from the routing engine. The optical link information is exchanged between the REM and the ORIB Synchronizer by means of the generic data structure of the OLS_payload. The OLS_payload is independent of the underlying routing engines. The REM is responsible for constructing the protocol-dependent PDUs (Protocol Data Unit) from the OLS_payload. The REM also interacts with the OLM, via the ORIB Synchronizer, to propagate the local OLS changes into the network 32 via the underlying routing engines.

The ORIB Interface 18 offers a variety of ORIB retrieval services to the applications 26, 28, 29. For example, before computing a new route, the Routing Computation application 26 needs to find all the optical links that satisfy the data stream constraints. It then computes a route based on the results of the ORIB search. The Topology Discovery Application 28 asks the ORIB to list all of the optical links so it can draw a network map. This map is updated according to the ORIB information, through the notification services offered by the ORIB interface. The ORIB interface hides the routing protocol details from the higher level applications, so that they can be developed without knowing the ORIB structure and the underlying routing protocol details.

The ORIB Synchronizer interacts with the REM and the OLM to keep the ORIB synchronized with the OLS database in the routing engine.

The TLV translator 30 offers two-way translation service. It can translate a given TLV into a readable data structure, and it can translate the information of a readable data structure into a TLV. This translator is designed to be independent of any specific TLV definition. The translator will consult a lookup table that contains all the TLVs supported by the system to do the translation. Changes in the definition of a TLV will not affect the implementation of the TLV Translator; only the lookup table needs to be updated.

To show how the whole system works to update the ORIB, two examples are given below to illustrate the updating procedure. The first example describes how the system works when OSPF receives an opaque LSA from the network 32. The second example illustrates how a new optical link created by the OLM will be propagated into the network.

EXAMPLE 1

OSPF Receives an Opaque LSA

When the underlying OSPF routing engine receives an opaque LSA from the network, it checks the integrity of the LSA, and stores it in its own LSDB (Link State Database). It then sends a notification to the REM telling it that an opaque LSA has been received. The notification contains the generic OLS_payload data structure constructed from the LSA, and an index that points to the LSA in the OSPF LSDB. The REM forwards the notification to the ORIB Synchronizer, which checks the ORIB for the index of the LSA and determines whether this LSA already exists.

If the LSA already exists, then it needs to be updated. First, the ORIB Synchronizer locks the LSA in the ORIB so that the other applications cannot access it. Then the ORIB Synchronizer extracts the top level TLV from OLS_payload, and requests the TLV translator to translate it into an OLSD structure with the top-level values filled in. If the translation is successful, the ORIB Synchronizer extracts the second TLV, and asks the TLV translator to translate it as well. After the translation, the corresponding data value is filled in the OLSD. The procedure repeats until the last TLV is extracted and translated. After all the TLVs from the OLS_payload are translated, the ORIB checks the integrity of the created OLSD. If the OLSD is correct, the ORIB overwrites the OLSD in the ORIB, and unlocks the LSA. If any failure occurs in the translation or during integrity checking, the LSA will be dropped, and the previous OLSD will be unlocked for access without change.

If no OLSD in the ORIB is found from the index of LSA, then a new LSA has been received. The translation procedure is the same except that a new OLSD will be inserted into the ORIB after the translation.

EXAMPLE 2

Propagating a Newly Created Optical Link

Suppose that a new optical link is created by the OLM. The OLM informs the ORIB Synchronizer of the creation of the new optical link by passing an OLSD structure with the index fields set to NULL. The ORIB then asks the TLV translator to translate the OLSD into TLVs. If the translation is successful, the ORIB Synchronizer creates a new OLS_payload data structure, and requests the REM to flood it into the network.

After receipt of the request, the REM will create an opaque LSA from the OLS_payload data, and ask the underlying routing engine to install it into its LSDB. The REM first launches the OSPF flooding procedure to propagate the new LSA into the network, then, it sends a notification to the ORIB Synchronizer to inform it that an LSA has been received. The ORIB Synchronizer then starts the ORIB synchronization procedure described in Example 1.

While specific embodiments of the invention have been described and illustrated it will be apparent to one skilled in the art that numerous changes can be made without departing from the basic concepts. It is to be understood that such changes will fall within the full scope of the invention as defined by the appended claims.

We claim:

1. A system for providing access to optical link state information in an optical network comprising:
    a unified database that maintains optical link state information independent of data structure of underlying routing protocols; and
    a protocol independent generic interface between the unified database and applications requiring access to the optical link state information.

2. The system as defined in claim 1 wherein the unified database is an optical routing information base (ORIB) implemented as an array of optical link state data (OLSD) structures.

3. The system as defined in claim 2 wherein the OLSD structures contains properties of an optical link that can be understood by multiple routing protocols.

4. The system as defined in claim 3 having an optical link manager (OLM) to manage optical links attached the optical network.

5. The system as defined in claim 4 having a routing engine manager (REM) to manage underlying routing protocols.

6. The system as defined in claim 5 wherein said REM interacts with an ORIB synchronizer to update the ORIB when a change in properties of an optical link is received from a routing engine.

7. The system as defined in claim 6 wherein the ORIB synchronizer interacts with the REM and the OLM to maintain the ORIB synchronized with the OLS database in the routing engine.

8. The system as defined in claim 6 wherein a Time/Length/Value (TLV) translator interfaces with the ORIB synchronizer to translate a TLV triplet into a readable data structure and to translate information of a readable data structure into a TLV triplet.

9. The system as defined in claim 8 wherein the TLV translator is independent of any specific TLV definition.

10. The system as defined in claim 8 wherein the TLV translator consults a look up table that contains all TLV triplets supported by the system.

11. The method as defined in claim 1 wherein the unified database ensures that the OLS information base structure is independent of the data structure specific to underlying routing protocol implementations.

12. A method of providing access to optical link state (OLS) information in an optical network comprising:
    maintaining optical link state information in a unified database, the optical link state information being independent of data structure of underlying routing protocols; and
    providing a protocol independent generic interface between the unified database and applications requiring access to the optical link state information.

13. The method as defined in claim 12 wherein access to said OLS information allows for updating OLS information and use of said information by applications.

14. The method as defined in claim 12 wherein applications that need to access OLS information can be developed without knowing the details of the underlying routing protocols.

15. The method as defined in claim 14 wherein the applications remain unchanged if a new routing protocol is deployed into a node.

* * * * *